US011294840B2

(12) United States Patent
Zhang et al.

(10) Patent No.: US 11,294,840 B2
(45) Date of Patent: Apr. 5, 2022

(54) DUAL-TREE BACKPLANE

(71) Applicant: Dell Products L.P., Round Rock, TX (US)

(72) Inventors: Zhuo Zhang, Shanghai (CN); Qi Zhang, Shanghai (CN); Zheng Zhang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/917,580

(22) Filed: Jun. 30, 2020

(65) Prior Publication Data
US 2021/0390068 A1 Dec. 16, 2021

(30) Foreign Application Priority Data
Jun. 12, 2020 (CN) .......................... 202010536117.7

(51) Int. Cl.
*G06F 13/40* (2006.01)
*G06F 13/42* (2006.01)
*G06F 1/18* (2006.01)

(52) U.S. Cl.
CPC .......... *G06F 13/4022* (2013.01); *G06F 1/185* (2013.01); *G06F 13/409* (2013.01); *G06F 13/4068* (2013.01); *G06F 13/4282* (2013.01); *G06F 2213/0026* (2013.01)

(58) Field of Classification Search
CPC .. G06F 13/4022; G06F 1/185; G06F 13/4068; G06F 13/409; G06F 13/4282; G06F 2213/0026
See application file for complete search history.

(56) References Cited

U.S. PATENT DOCUMENTS

| | | | | |
|---|---|---|---|---|
| 6,795,885 B1* | 9/2004 | deBlanc | ............... | G06F 11/2007 361/729 |
| 7,562,174 B2* | 7/2009 | Danilak | .................... | G06F 3/14 710/305 |
| 10,445,279 B1* | 10/2019 | Itkin | .................... | G06F 9/44505 |
| 2012/0151097 A1* | 6/2012 | Lambert | ............... | G06F 3/0605 710/13 |
| 2013/0201819 A1* | 8/2013 | Hu | ....................... | H04L 41/0668 370/219 |
| 2014/0250322 A1* | 9/2014 | Fleischmann | ....... | H04L 67/1097 714/6.22 |
| 2015/0146353 A1* | 5/2015 | MacNeil | .................. | G06F 1/187 361/679.02 |
| 2016/0154765 A1* | 6/2016 | Shin | ..................... | G06F 13/4295 710/302 |
| 2017/0371814 A1* | 12/2017 | Stuhlsatz | ............ | G06F 13/4282 |

(Continued)

*Primary Examiner* — Henry Tsai
*Assistant Examiner* — Harry Z Wang
(74) *Attorney, Agent, or Firm* — Jackson Walker L.L.P.

(57) ABSTRACT

An information handling system may include at least one processor; a first and a second backplane, wherein the first and second backplanes are Peripheral Component Interconnect Express (PCIe) backplanes; and a physical storage resource. The physical storage resource may be coupled to the at least one processor via a first port of the physical storage resource and via the first backplane, and the physical storage resource may be further coupled to the at least one processor via a second port of the physical storage resource and via the second backplane.

13 Claims, 3 Drawing Sheets

(56) References Cited

U.S. PATENT DOCUMENTS

2018/0024743 A1* 1/2018 Herman .................. G06F 3/067
                                                            710/316
2018/0032463 A1* 2/2018 Olarig ................. G06F 13/4282
2018/0349188 A1* 12/2018 Beckett ..................... G06F 9/50

* cited by examiner

DUAL-TREE BACKPLANE

TECHNICAL FIELD

The present disclosure relates in general to information handling systems, and more particularly to backplanes for coupling physical storage resources to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Non-Volatile Memory Express (NVMe) is a protocol for accessing high-speed storage media (e.g., solid state disks) that brings many advantages compared to legacy protocols. It operates across the Peripheral Component Interconnect Express (PCIe) bus, which allows the drives to act more like the fast memory that they are, rather than the hard disks that they imitate.

PCIe is based on point-to-point topology, with separate serial links connecting every device to the root complex (host). Accordingly, one or more expandable backplanes are usually required to use a large number of drives. Moreover, extensibility and scalability are serious issues. Unlike other conventional fabrics (e.g., serial-attached SCSI (SAS) or Fibre Channel (FC)), NVMe drives are placed in the leaf nodes of a PCIe-based tree topology. Therefore, the storage traffic cannot be balanced between multiple cable paths, and further, no redundancy links are available for failover purposes.

This disclosure thus presents a dual-tree topology fabric to connect a number of dual-port NVMe drives. This fabric can be established in some embodiments by a set of specially designed expandable backplanes which are connected one after another. With this approach, the storage traffic can be balanced between at least two uplink paths, and each NVMe drive has two redundancy links to one host.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing backplanes may be reduced or eliminated.

In accordance with embodiments of the present disclosure, an information handling system may include at least one processor; a first and a second backplane, wherein the first and second backplanes are Peripheral Component Interconnect Express (PCIe) backplanes; and a physical storage resource. The physical storage resource may be coupled to the at least one processor via a first port of the physical storage resource and via the first backplane, and the physical storage resource may be further coupled to the at least one processor via a second port of the physical storage resource and via the second backplane.

In accordance with these and other embodiments of the present disclosure, a method may include coupling a first and a second backplane to an information handling system, wherein the first and second backplanes are Peripheral Component Interconnect Express (PCIe) backplanes; and coupling a physical storage resource to the first and second backplanes such that the physical storage resource is coupled to the at least one processor via a first port of the physical storage resource and via the first backplane, and the physical storage resource is further coupled to the at least one processor via a second port of the physical storage resource and via the second backplane.

In accordance with these and other embodiments of the present disclosure, an article of manufacture may include a non-transitory, computer-readable medium having computer-executable code thereon that is executable by an information handling system including a first and a second backplane, wherein the first and second backplanes are Peripheral Component Interconnect Express (PCIe) backplanes, and a physical storage resource, the computer-executable code being executable for: communicating with the physical storage resource via a coupling between the first backplane and a first port of the physical storage resource; and communicating with the physical storage resource via a coupling between the second backplane and a second port of the physical storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
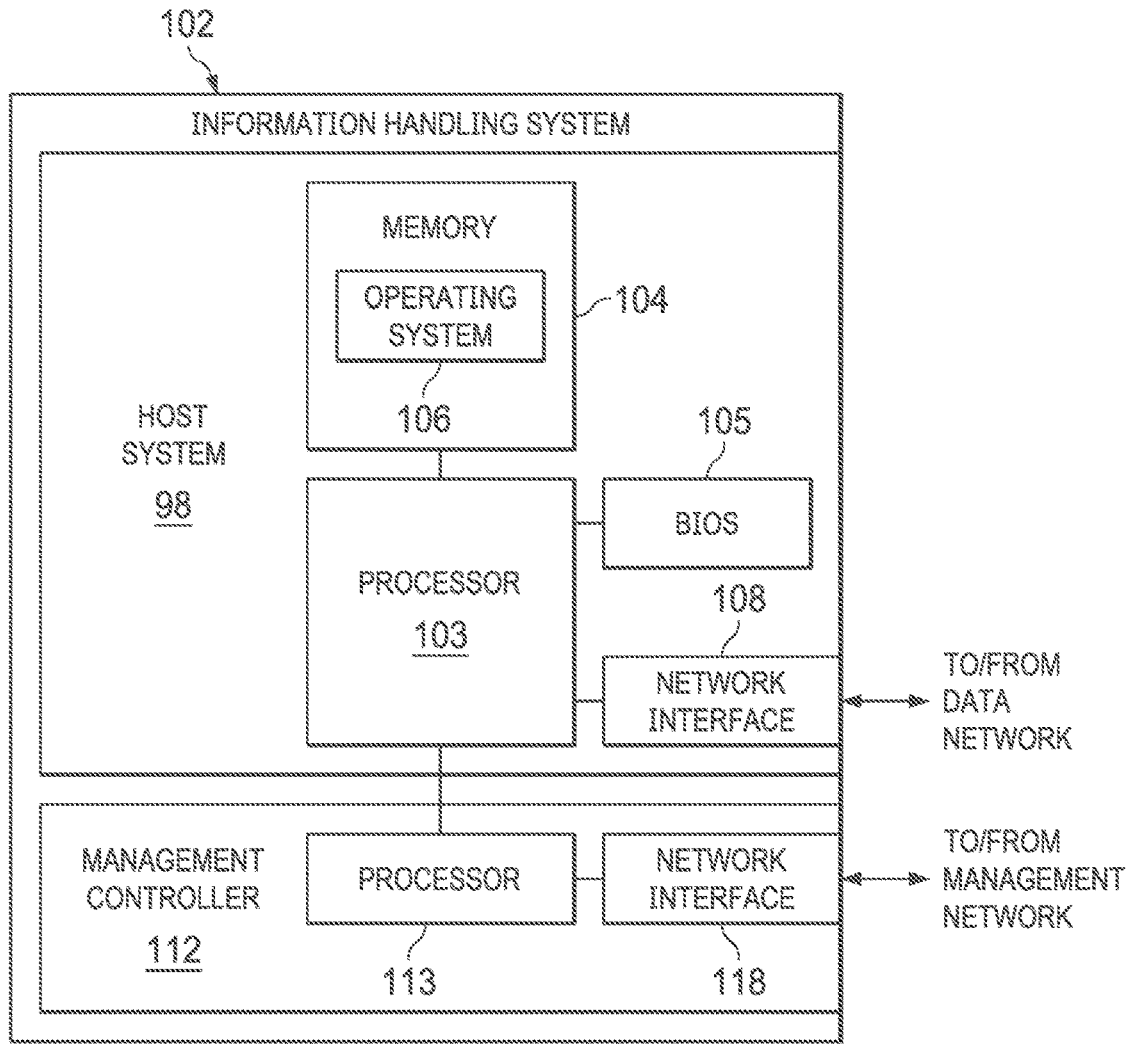
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Memory 104 of information handling system 102 may comprise one or more physical storage resources (e.g., NVMe storage resources). Such devices may be coupled via one or more backplanes. In some embodiments, they may comprise dual-port (or multi-port) NVMe drives.

Figure 2:
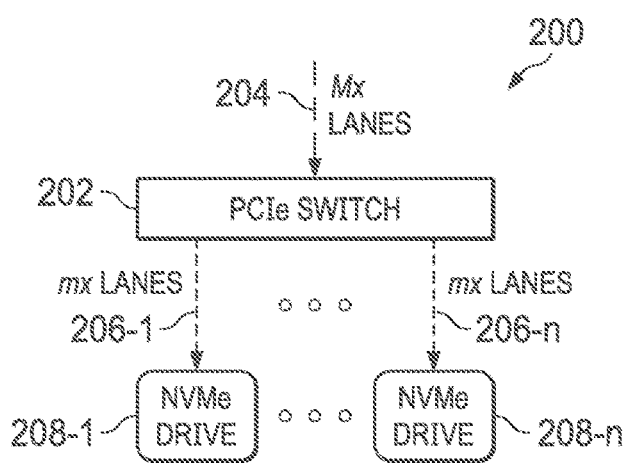
FIG. 2 illustrates a block diagram of an example backplane, in accordance with embodiments of the present disclosure.

FIG. 2 shows selected components of an example of an expandable NVMe backplane 200. Backplane 200 contains a PCIe switch 202 with an M-lane upstream link 204 and n downstream slots for NVMe drives 208-1 through 208-$n$, each slot having m lanes. (For example, in many cases m=4, such that each slot uses a PCIe x4 link.) That is, PCIe switch 202 has one M-lane upstream link 204 and m*n downstream lanes, where typically M=m or 2m (e.g., when m=4, M would use a x4 or x8 PCIe link).

Figure 3:
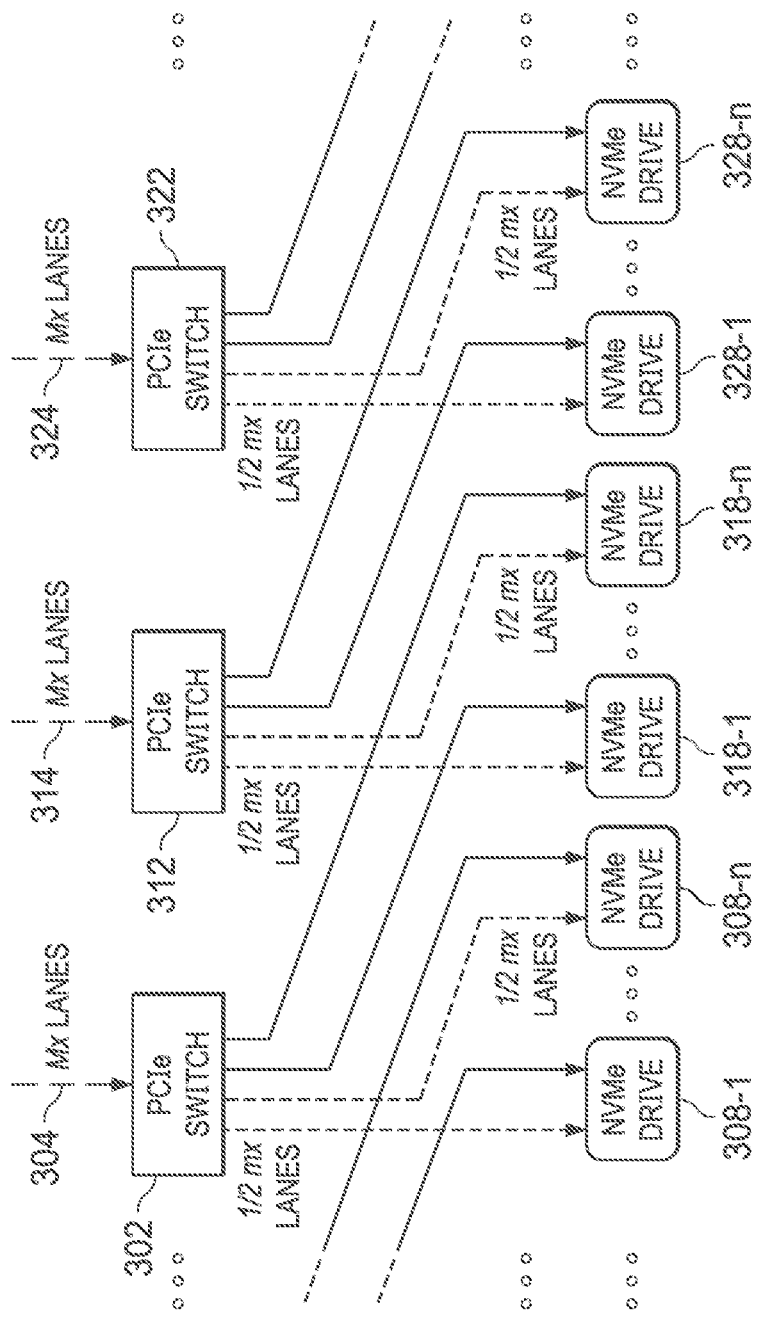
FIG. 3 illustrates a block diagram of a plurality of example backplanes, in accordance with embodiments of the present disclosure.

FIG. 3 illustrates selected components of a system including a plurality of backplanes (three are shown explicitly, but any desired number of backplanes may be used in any particular embodiment). As shown in FIG. 3, in some embodiments, the lanes of the downstream links on each backplane may be divided into two parts. PCIe switch 302 includes an M-lane upstream link 304, similar to PCIe switch 202. But the downstream lanes of PCIe switch 302 may be split, such that only half of the m*n lanes are dedicated to NVMe drives 308-1 through 308-$n$ (the drives that are in the slots of this backplane). The remainder of the downstream lanes are dedicated to a different set of NVMe drives, 318-1 through 318-$n$ (which are in the slots of another backplane). Similar arrangements are shown for PCIe switches 312 and 322.

That is, half of the downstream lanes for a given backplane may be connected to the drive slots on the same backplane. The remaining half of the downstream lanes may cascade to another adjacent backplane. Hence, each backplane may have its own upstream link, and the backplanes may be chained one after another. Each dual-port NVMe drive may thus map to two upstream paths via its primary port and secondary port respectively.

Figure 4:
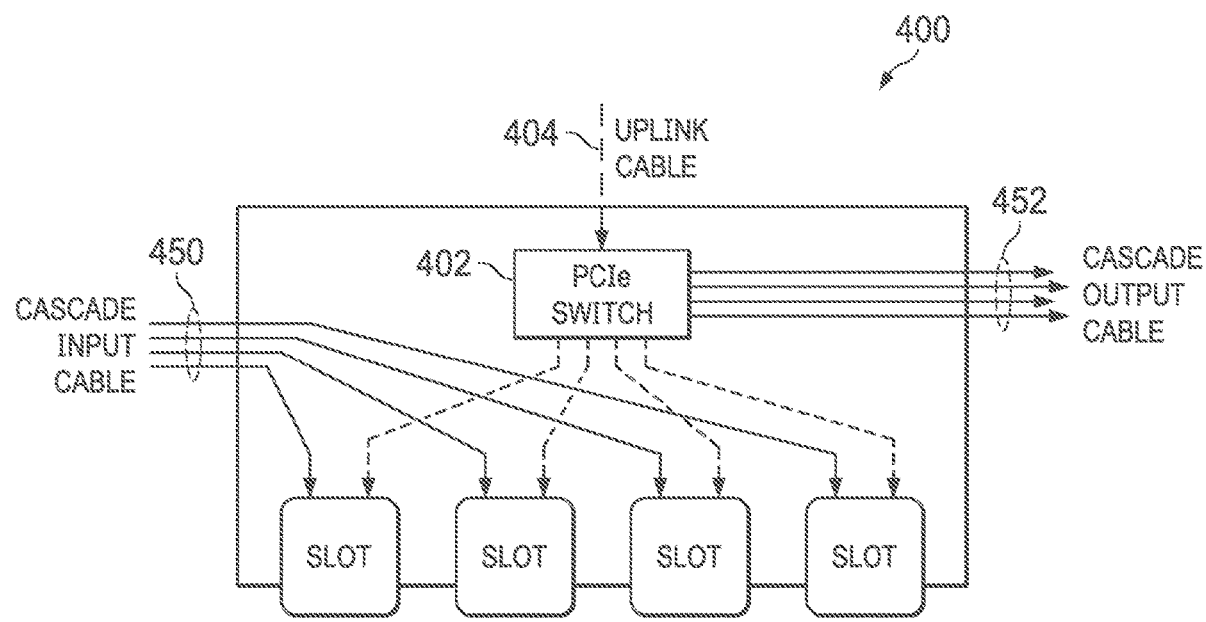
FIG. 4 illustrates a block diagram of an example backplane, in accordance with embodiments of the present disclosure.

FIG. 4 illustrates a block diagram of a dual-tree backplane 400, including PCIe switch 402. As discussed above, the lanes of downstream links on each backplane may be divided into two parts (m*n/2 lanes for each). A cascade output port may be used for the remaining m*n/2 lanes derived from PCIe switch 402. A cascade cable may connect one cascade output port and another cascade input port between two adjacent backplanes, allowing the PCIe lanes from one backplane to be coupled to the NVMe drives of an adjacent backplane.

For example, cascade input cable 450 may provide m*n/2 PCIe lanes to the n NVMe drives coupled to backplane 400. Similarly, cascade output cable 452 may provide m*n/2 PCIe lanes from PCIe switch 402 to the n NVMe drives coupled to an adjacent backplane (not shown).

In some embodiments, all backplanes may be chained together in a circular fashion, one after another. For example, consider an embodiment with three backplanes. Half of the lanes of the first backplane would be coupled to the drives in the slots of the first backplane, and the other half would be coupled (e.g., via a cascade port) to the drives in the slots of the second backplane. Half of the lanes of the second backplane would be coupled to the drives in the slots of the second backplane, and the other half would be coupled (e.g., via a cascade port) to the drives in the slots of the third backplane. Half of the lanes of the third backplane would be coupled to the drives in the slots of the third backplane, and the other half would be coupled (e.g., via a cascade port) to the drives in the slots of the first backplane.

Figure 5:
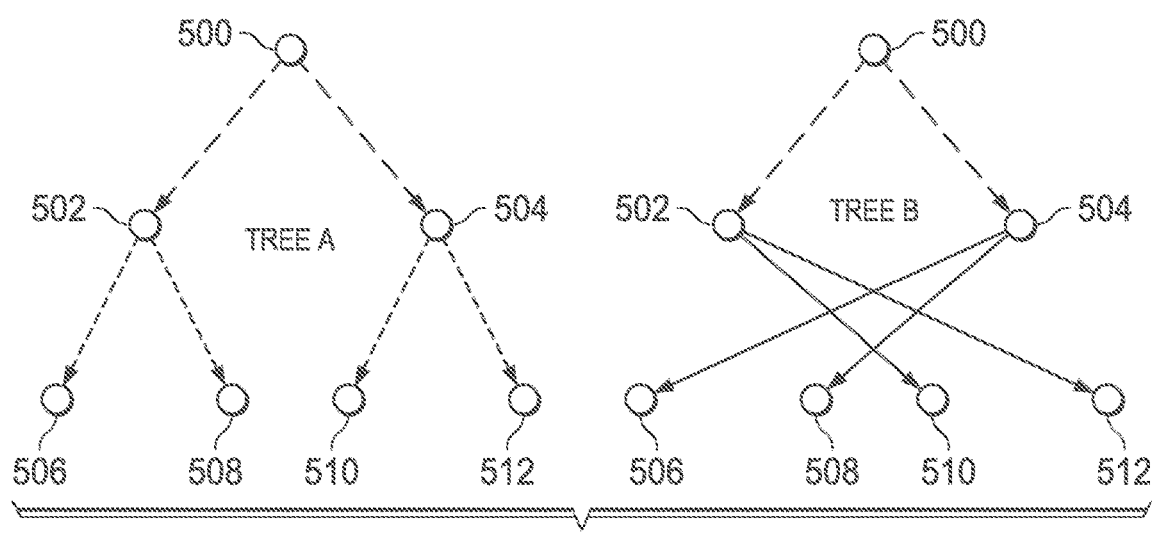
FIG. 5 illustrates a block diagram of an example topology, in accordance with embodiments of the present disclosure.

FIG. 5 shows an example of a dual-tree topology in which two backplanes 502 and 504 are coupled to a root complex 500. Both Tree A and Tree B couple to the same set of NVMe drives 506, 508, 510, and 512.

Each slot in the two backplanes 502 and 504 may support a dual-port NVMe drive. Half of the output lanes derived from the same backplane may be mapped to each primary port on an NVMe drive. The rest of the lanes derived from an adjacent backplane may be mapped to each secondary port on an NVMe drive. Accordingly, all NVMe drives may form a PCIe topology tree marked as Tree A via their primary ports and likewise for Tree B via their secondary ports.

Tree A and Tree B may share the same set of upstream links but interlace on each downstream port. Therefore, each drive may have two redundant links, eliminating the possibility of a single-link failure. Moreover, in comparison to current solutions, the bandwidth capability for each n drives on one backplane is enlarged from M lanes to 2M lanes.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a plurality of backplanes, wherein the backplanes are Peripheral Component Interconnect Express (PCIe) backplanes each having downstream PCIe lanes; and
   a plurality of physical storage resources;
   wherein each of the plurality of physical storage resources is coupled to the at least one processor via a first port of the physical storage resource and via half the downstream PCIe lanes of one backplane, wherein each of the plurality of physical storage resources is further coupled to the at least one processor via a second port of the physical storage resource and via half the downstream PCIe lanes of another backplane;
   wherein each of the plurality of backplanes has a corresponding physical storage resource that is directly coupled to the backplane via a slot of the backplane; and
   wherein the plurality of backplanes and their corresponding physical storage resources are coupled together in a circular fashion such that, starting from a first backplane, each backplane is directly coupled to the corresponding physical storage resource of a next backplane, and a last backplane is directly coupled to the corresponding physical storage resource of the first backplane.

2. The information handling system of claim 1, wherein the physical storage resource is a Non-Volatile Memory Express (NVMe) resource.

3. The information handling system of claim 1, wherein each backplane includes a plurality of slots, each slot being coupled to a corresponding physical storage resource.

4. The information handling system of claim 3, wherein each corresponding physical storage resource is also coupled to a different backplane.

5. The information handling system of claim 1, wherein each of the plurality of physical storage resources is directly coupled to a particular one of the backplanes via a particular slot, and coupled to another one of the backplanes via a cascade cable.

6. A method comprising:
   coupling a plurality of backplanes to an information handling system, wherein the backplanes are Peripheral Component Interconnect Express (PCIe) backplanes each having downstream PCIe lanes;
   coupling a plurality of physical storage resources to the information handling system such that each of the plurality of physical storage resources is coupled via a first port of the physical storage resource and via half the downstream PCIe lanes of one backplane, and each of the plurality of physical storage resources is further coupled via a second port of the physical storage resource and via half the downstream PCIe lanes of a different backplane;
   directly coupling each of the plurality of backplanes to a corresponding physical storage resource via a slot of the backplane; and
   coupling the plurality of backplanes and their corresponding physical storage resources in a circular fashion such that, starting from a first backplane, each backplane is directly coupled to the corresponding physical storage resource of a next backplane, and a last backplane is directly coupled to the corresponding physical storage resource of the first backplane.

7. The method of claim 6, wherein the physical storage resource is a Non-Volatile Memory Express (NVMe) resource.

8. The method of claim 6, wherein each of the plurality of physical storage resources is coupled to a particular one of the backplanes via a particular slot, and coupled to another one of the backplanes via a cascade cable.

9. An article of manufacture comprising a non-transitory, computer-readable medium having computer-executable code thereon that is executable by an information handling system including a plurality of backplanes, wherein the backplanes are Peripheral Component Interconnect Express (PCIe) backplanes each having downstream PCIe lanes, and a plurality of physical storage resources; wherein each of the plurality of backplanes has a corresponding physical storage resource that is directly coupled to the backplane via a slot of the backplane; and wherein the plurality of backplanes and their corresponding physical storage resources are coupled together in a circular fashion such that, starting from a first backplane, each backplane is directly coupled to the corresponding physical storage resource of a next backplane, and a last backplane is directly coupled to the corresponding physical storage resource of the first backplane, the computer-executable code being executable for:
   communicating with each of the plurality of physical storage resources via a first coupling between one backplane and a first port of the physical storage resource, the first coupling including half the downstream PCIe lanes of the one backplane; and
   communicating with each of the plurality of physical storage resources via a second coupling between another backplane and a second port of the physical storage resource, the second coupling including half the downstream PCIe lanes of the another backplane.

10. The article of claim 9, wherein the physical storage resource is a Non-Volatile Memory Express (NVMe) resource.

11. The article of claim 9, wherein each backplane includes a plurality of slots, each slot being coupled to a corresponding physical storage resource.

12. The article of claim 11, wherein each corresponding physical storage resource is also coupled to a different backplane.

13. The article of claim 9, wherein each of the plurality of physical storage resources is directly coupled to a particular one of the backplanes via a particular slot, and directly coupled to another one of the backplanes via a cascade cable.

\* \* \* \* \*